United States Patent
Vormweg (10) Patent No.: US 9,870,581 B1
(45) Date of Patent: Jan. 16, 2018

(54) CONTENT ITEM ELEMENT MARKETPLACE

(71) Applicant: Google Inc., Mountain View, CA (US)

(72) Inventor: Jonas Vormweg, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 600 days.

(21) Appl. No.: 14/501,350

(22) Filed: Sep. 30, 2014

(51) Int. Cl.
   *G06Q 30/00* (2012.01)
   *G06Q 30/06* (2012.01)
   *G06Q 20/12* (2012.01)

(52) U.S. Cl.
   CPC ....... *G06Q 30/0609* (2013.01); *G06Q 20/123* (2013.01); *G06Q 30/0623* (2013.01)

(58) Field of Classification Search
   CPC .......................................... G06Q 30/06–30/08
   USPC .................................. 705/26.1–27.2
   See application file for complete search history.

(56) References Cited

U.S. PATENT DOCUMENTS

| | | |
|---|---|---|
| 7,848,956 B1 | 12/2010 | MacLean |
| 8,341,525 B1 | 12/2012 | Achour et al. |
| 8,667,016 B2 | 3/2014 | Sims et al. |
| 2003/0005428 A1* | 1/2003 | Roman .................. G06Q 30/06 725/1 |
| 2005/0050093 A1* | 3/2005 | Atkin .................... G06Q 30/02 |
| 2007/0234214 A1 | 10/2007 | Lovejoy et al. |
| 2008/0046953 A1 | 2/2008 | Kossila |
| 2008/0184288 A1 | 7/2008 | Lipscomb |
| 2008/0307310 A1 | 12/2008 | Segal et al. |
| 2009/0138349 A1 | 5/2009 | Drucker et al. |
| 2011/0099083 A1 | 4/2011 | Karpinsky |
| 2012/0324495 A1* | 12/2012 | Matthews, III ...... H04H 60/372 725/14 |
| 2013/0060628 A1 | 3/2013 | Catrambone |
| 2014/0149467 A1 | 5/2014 | Schnitman |

OTHER PUBLICATIONS

"Stock Footage," http://www.pond5.com/stock-video-footage/1/*.html, website http://www.pond5.com/, retrieved on Oct. 7, 2014, 2 pages.
The World's Stock Photography at One Web Site™, "Stock Photography," http://www.fotosearch.com/, Jul. 2, 2014, 2 pages.

* cited by examiner

*Primary Examiner* — Ethan D Civan
(74) *Attorney, Agent, or Firm* — Lowenstein Sandler LLP (57) ABSTRACT

A method for providing a content item element marketplace is disclosed. The method includes receiving an element uploaded by an element provider, the element comprising a segment of media that enhances presentation of a content item, identifying the element as participating in the element marketplace, obtaining, from the element provider, identification of one or more accepted payment modalities for the element, associating the identified element with the obtained one or more accepted payment modalities in the element marketplace, and providing the identified element in the element marketplace for browsing by content creators.

23 Claims, 6 Drawing Sheets

Receive selection of an element from an element marketplace by a content creator
410

Present accepted payment modalities associated with the selected element to the content creator
420

Receive selection of one of the accepted payment modalities for the element from the content creator
430

Generate transaction record indicating the selected element, a reference corresponding to the element, the element provider, the content creator, and the selected payment modality to apply to the transaction
440

Utilize the transaction record to identify views of the element in a content item of the content creator
450

Determine payment due to the element provider based on the identified views and the selected payment modality to apply to the transaction
460

CONTENT ITEM ELEMENT MARKETPLACE

TECHNICAL FIELD

This disclosure relates to the field of content sharing platforms and, in particular, to providing a content item element marketplace.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

To create content, users often use, or would like to user, third-party content item elements, such as music clips, video clips, still shots, and effects, to name a few examples. These content item elements can be difficult to access, locked away, or not produced yet. In addition, the content creators need to secure rights for the third-party content item elements, which can be cumbersome and time-consuming. Furthermore, the content creators often have to pay for use of the content item elements, meaning there is an upfront investment and separate payment process involved in utilizing the third-party content item elements, which can lead to a pricing challenge for the content creator. Similarly, the content item element provider (e.g., the element owner) may have difficulty tracking where his or her elements end up and other analytics associated with the use of the element. These problems can lead to market inefficiencies, missed opportunities, and lack of access to and use of available content item elements.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing a content item element marketplace is disclosed. The method includes receiving an element uploaded by an element provider, the element comprising a segment of media that enhances presentation of a content item, identifying the element as participating in the element marketplace, obtaining, from the element provider, identification of one or more accepted payment modalities for the element, associating the identified element with the obtained one or more accepted payment modalities in the element marketplace, and providing the identified element in the element marketplace for browsing by content creators.

In one implementation, the element may include at least one of an audio clip, a video clip, a still image, or computer-generated special effect. Furthermore, the method may include registering the element provider to the element marketplace. In another implementation, the one or more accepted payment modalities include revenue sharing. In addition, the one or more accepted payment modalities include at least one of flat fee per view, single flat fee, attribution, and free. The method may also include, prior to identifying the element, determining that the element is in compliance with commercial use rights. In addition, the method can include generating and storing a reference to the element, the reference comprising a copy of the element utilized to identify occurrence of the element in content items.

In further implementations, the method includes obtaining, from the element provider, policies governing use of the element, the policies comprising at least a geographic location that the element can be used, a genre of content item that the element can be used in, or a maturity of the content item that the element can be used in. Furthermore, the method may include receiving selection of the element from a content creator of the content creators as part of a transaction in the element marketplace, receiving, from the content creator, selection of one of the accepted payment modalities for the element, generating a transaction record to identify the transaction, the transaction record comprising identification of: the selected element, the reference corresponding to the selected element, the element provider, the content creator, and the selected payment modality, utilizing the transaction record to identify a content item comprising the element and views of the element in the content item, wherein the content item generated by the content creator, and determining a payment due to the element provider based on the identified views and the selected payment modality.

In another implementation, the method includes obtaining statistics associated with views of the elements, use of elements, and content items utilizing the elements of the element marketplace, and generating analytic reports for the element provider, the content creators, and element marketplace based on the obtained statistics.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

DETAILED DESCRIPTION

Implementations are described for providing a content item element marketplace. In implementations of the disclosure, an element marketplace component of a content sharing platform provides a central location to store content item elements and facilitate the exchange and distribution of the content item elements. A content item element may refer to a short segment of media, such as an audio clip (e.g., music, voice, and sound effect), video clip, still shot image, and/or computer-generated special effects, which enhances the presentation of a content item. In other words, the content item element is a raw material of another production that is used to enhance the content item.

A content item element may be referred to herein as an "element." Furthermore, for purposes of the description herein, an "element provider" refers to a user that creates and/or owns an element, while a "content creator" refers to a user that creates a content item incorporating an element provided by an element provider. In one implementation, a content creator may access an element from the element marketplace and integrate the element into a content item generated by the content creator in editing software used by the content creator.

In implementations of the disclosure, the element marketplace component provides an element marketplace to facilitate the distribution and exchange of elements for the content sharing platform. The element marketplace component allows element providers to upload elements to the element marketplace, set policies on how elements are to be utilized, and establish different payment modalities for the elements. The element marketplace component surfaces elements for content creators and facilitates matching elements providers with content creators. Furthermore, the element marketplace component tracks element transactions between element providers and content creators and manages the payment modality agreed upon between the element providers and content creators. The element marketplace component can also provide analytics and reporting associated with elements to the element providers and content creators.

Previously, content sharing platforms did not provide a central marketplace for elements to use in content item creation. Implementations of the disclosure introduce a content item element marketplace for obtaining elements for use with content item creation. As such, implementations of the disclosure may provide an efficient and convenient solution for content item creators to obtain and utilize elements as part of generating content items. In addition, the element marketplace of implementations of the disclosure provides a convenient and useful solution for element providers to showcase and monetize use of elements generated by the element providers. For example, the element marketplace may create a self-serve market and/or business opportunity for element providers that did not previously exist.

Figure 1:
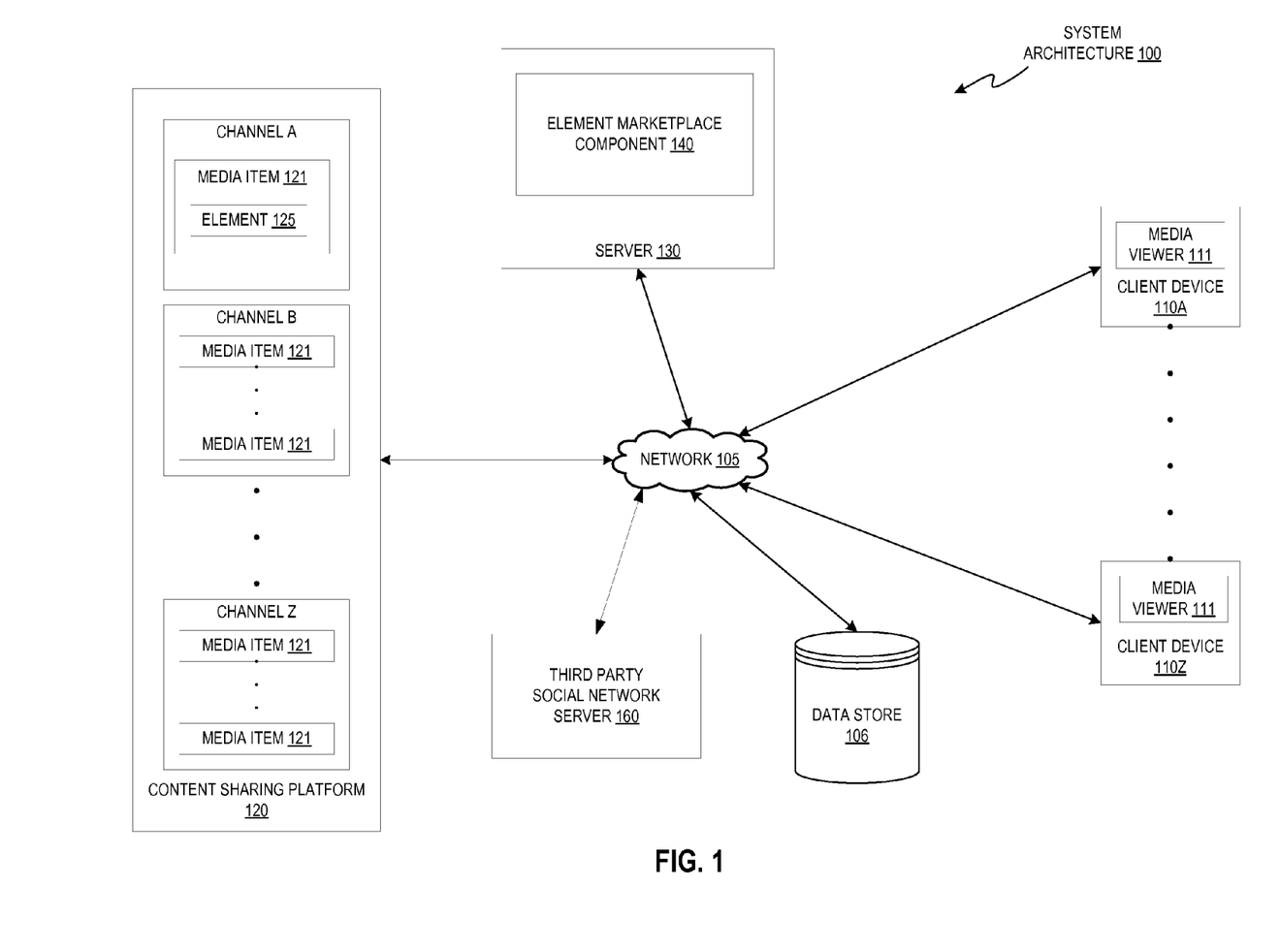
FIG. 1 illustrates an example system architecture, in accordance with one implementation of the disclosure.

FIG. 1 illustrates an example system architecture 100, in accordance with one implementation of the disclosure, for navigation of a list of content sharing platform media items on a client device via gesture controls and contextual synchronization. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consumer, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include an element marketplace component 140. The element marketplace component 140 provides a central repository to store content item elements and facilitate the exchange and distribution of the content item elements 125. A content item element 125 refers to a short segment of media, such as an audio clip (e.g., music, voice, and sound effect), video clip, still shot image, and/or computer-generated special effects, which enhances the presentation of a content item 121. In other words, the content item element 125 is a raw material of another production that is used to enhance the content item 121.

A content item element 125 may be referred to herein as an "element." Furthermore, for purposes of the description herein, an "element provider" refers to a user that creates and/or owns an element, while a "content creator" refers to a user that creates a content item 121 incorporating an element 125 provided by an element provider. In one implementation, a content creator may access an element 125 from the element marketplace and integrate the element 125 into a content item 121 generated by the content creator at editing software used by the content creator. In some implementations, the media viewer 111 at client device 110A-110Z may include an editing software component that can integrate elements 125 into content items 121 under the direction of a content creator. In other implementations, the editing software may be an on-line editor that is integrated with the element marketplace components (e.g., via drag and drop).

In implementations of the disclosure, the element marketplace component 140 provides an element marketplace to facilitate the distribution and exchange of elements 125 for the content sharing platform 120. The element marketplace component 140 allows element providers to upload elements 125 to the element marketplace, set policies on how elements 125 are to be utilized, and establish different payment modalities for the elements 125. The element marketplace component 140 surfaces elements 125 for content creators and facilitates matching elements providers with content creators. Furthermore, the element marketplace component 140 tracks element transactions between element providers and content creators and manages the payment modality agreed upon between the element providers and content creators. The element marketplace component 140 can also provide analytics and reporting associated with elements 125 to the element providers and content creators.

In some implementations, element marketplace component 140 of server 130 may interact with content sharing platform and/or with other third party social network servers 150 to provide implementations of the disclosure. Aspects of the element marketplace component 140 and its specific functions are further described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users. Furthermore, implementations of the disclosure may be applicable beyond social networks, and apply generally to any type of professional platform or client software. For example, implementations of the disclosure may be utilized on any type of platform that allows users to select elements for content item projects, such as video projects.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
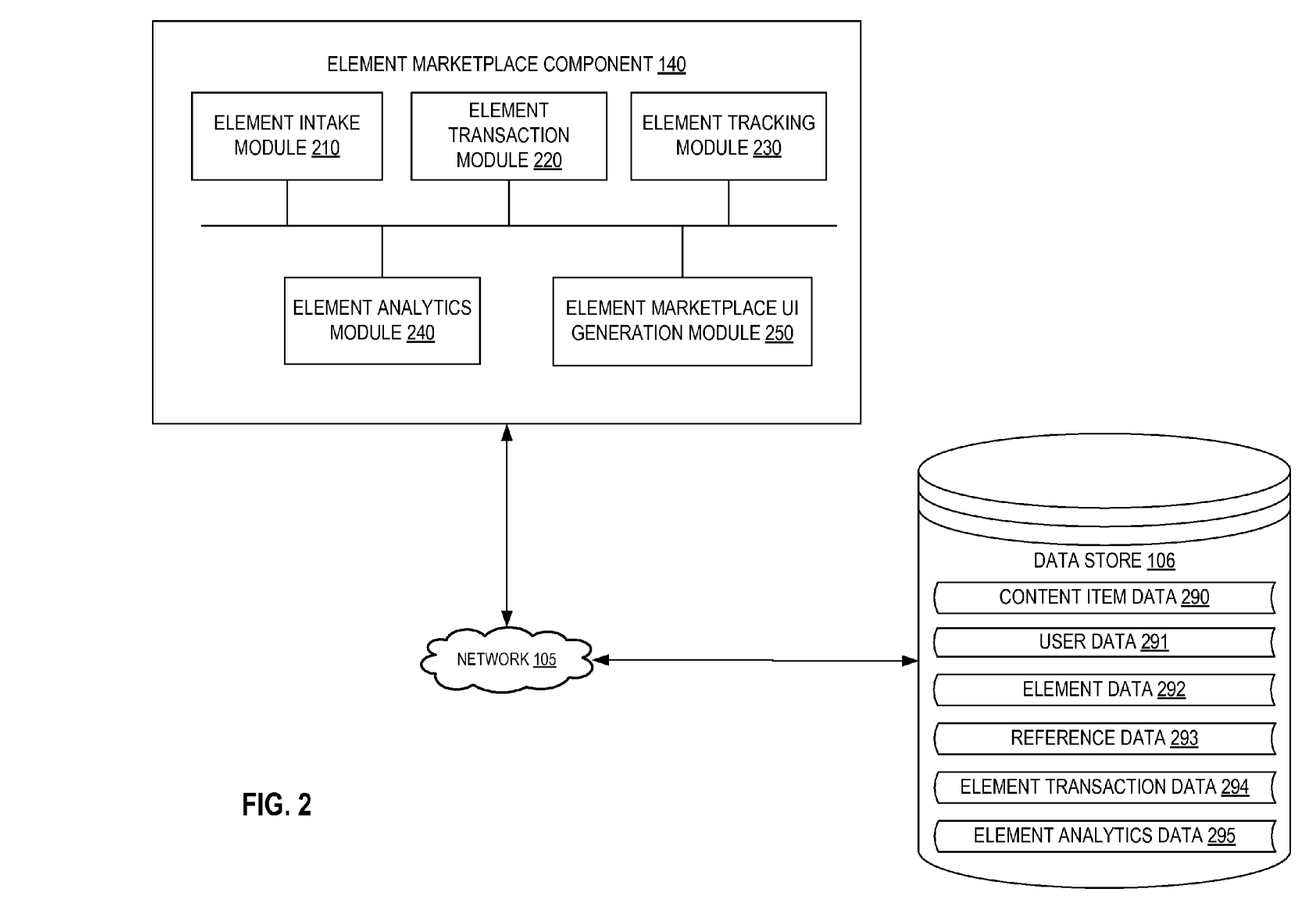
FIG. 2 is a block diagram illustrating an element marketplace component in accordance with one implementation of the disclosure.

FIG. 2 is a block diagram illustrating an element marketplace component 140 in accordance with one implementation of the disclosure. In one implementation, the element marketplace component 140 includes an element intake module 210, an element transaction module 220, an element tracking module 230, an element analytics module 240, and an element marketplace UI generation module 250. More or less components may be included in the element marketplace component 140 without loss of generality. For example, two of the modules may be combined into a single module, or one of the modules may be divided into two or more modules. In one implementation, one or more of the modules may reside on different computing devices (e.g., different server computers).

The element marketplace component 140 is communicatively coupled to the data store 106. For example, the element marketplace component 140 may be coupled to the data store 106 via a network (e.g., via network 105 as illustrated in FIG. 1). In another example, the element marketplace component 140 may be coupled directly to a server where the element marketplace component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, element data 292, reference data, element transaction data 294, and element analytics data 295.

As discussed above, the element marketplace component 140 provides a central repository to store content item elements, such as elements 125 described with respect to FIG. 1, and facilitate the exchange and distribution of the content item elements. A content item element refers to a short segment of media, such as an audio clip (e.g., music, voice, and sound effect), video clip, still shot image, and/or computer-generated special effects, which enhances the presentation of a content item. In other words, the content item element is a raw material of another production that is used to enhance the content item.

In implementations of the disclosure, the element marketplace component 140 provides an element marketplace to facilitate the distribution and exchange of elements for the content sharing platform 120. The element intake module 210 enables the registering of element providers and ingestion of elements from registered element providers. The ingestion of elements by element intake module may include receiving an element by an element provider and indexing the received element in the element data 292 of data store 106. The element intake module 210 may examine a received element to ensure that it does not violate any known commercial use rights before indexing the received element. In one implementation, a received element is tagged to indicate its participation in the element marketplace. Tagging an element may refer to identifying the element in some form (e.g., with metadata, a marker, flag, etc.) to provide information to a user. In another implementation, a reference for the received element is generated and stored in reference data 293 of data store 106. A reference may refer to a copy of the element that is used to compare against ingested content to the content sharing platform for matching purposes. The reference for the received element may be utilized by element tracing module 230, as discussed further below.

In one implementation, the element intake module 210 allows element providers to indicate acceptable payment modalities for the uploaded elements of the element providers. For example, an element provider may indicate that a content creator can tender payment for an element of the element provider via revenue sharing (e.g., 2% of all revenue generated for the content item), all access flat fee payment, flat fee payment per content item, payment per view of content item, free (no payment for use), or attribution (e.g., link to element provider), to name a few examples. A revenue sharing fee arrangement allows a content creator to avoid an up-front investment in an element, while still providing payment depending on the success of the content item. Attribution provides identifying information (e.g., a link, description, etc.) of the element provider as part of the content item (e.g., in metadata or description of content item, in end card (e.g., credits) of content item, etc.). In some implementations, attribution for an element may be automatically provided by the content sharing platform for all elements.

An element provider may elect to offer more than one type of payment modality for an element, from which a content creator can select from when obtaining the element from the element marketplace. The configured payment modalities for an element may be stored as metadata of the element in element data 292.

In another implementation, the element intake module 210 allows elements providers to set policies on how elements can be utilized by content creators. For example, the element provider may establish permissions for the element to be used in specific geographic localities or with specific types (e.g., mature audiences) or genres of a content item. The element provider may also establish permission to use an element for noncommercial uses (e.g., cannot use an element in a content item that is being monetized by the content creator). The configured use policies for an element may be stored as metadata of the element in element data 292.

Once the element is stored, tagged, and referenced, the element may be indicated as available in the element marketplace. The element marketplace UI generation module 250 may be responsible for generating of UI for the element marketplace that allows users, such as content creators, to browse available elements for inclusion in content items.

In one implementation, the element transaction module 220 facilitates matching elements providers with content creators in the element marketplace. As discussed, the element marketplace UI generation module 250 provides a UI for content creators to browse available elements. The generated UI for the element marketplace may present descriptions, previews, ratings, user feedback, and so on for the available elements. This information may be obtained as metadata of the elements stored in element data 292. The generated UI also provides options for content creators to select and obtain available elements for use in a content item.

When a content creator selects an available element, the element transaction module 220 provides the available payment modalities corresponding to the selected element (as configured by the element provider of the selected element), and receives the selection of a payment modality from the content creator for the element. The element transaction module 220 then generates a record of the transaction to be stored in element transaction data 294 of data store 106. The record of the transaction may indicate the selected element, the reference corresponding to the selected element, the element provider, the content creator, and the payment modality agreed upon for the transaction.

The element tracking module 230 monitors element transactions between element providers and content creators and manages the payment modality agreed upon between the element providers and content creators. In one implementation, a transaction record generated by the element transaction module 220 is utilized for monitoring transactions and managing payment terms. In one implementation, the transaction record may indicate the selected element, a reference corresponding to the selected element, the element provider, the content creator, and the selected payment modality to apply to the transaction. Furthermore, the transaction record may identify and log in which content items the element has been used.

The element tracking module 230 may utilize the reference to identify content items containing the element. For any content items containing the element, the element tracking module 230 then can determine whether the content creator owns the content item and, if so, determine a number of views of the content item having the element, view attributions associated with the content item, and other statistics associated with the use of the element in the content item (e.g., likes, +1s, shares, watch time, reception, revenue, etc.).

Based on the gathered statistics associated with the content item having the element and the indicated payment modality between the element provider/content creator pair for the element, the element tracking module 230 can determine payment fees due to the element provider and/or the content sharing platform from the content creator (for use of the element). These determined payment due are then communicated to the relevant parties to the transaction.

The element analytics module 240 provides analytics and reporting associated with elements to the element providers and content creators. For an element provider, the element analytics module 240 may present reports (e.g., a graph, chart, or other visual display) illustrating how often elements of the element provider have been used, who (content creator) is using the elements, what content items are using the elements, how the content creators and content items having the element are performing (e.g., in terms of views, revenue, watch time, reception (e.g., likes, +1s, shares, and so on), etc.), other element providers used in same content items as elements, and regional statistics associated with element usage and viewing. Other reports and analytics for element providers may also be generated by the element analytics module 240.

The element analytics module 240 may also provide analytics and reporting to content creators that provide recommendations for elements based on previous element usage, revenue share breakdowns, indications on how addition of elements has improved performance of a content item and/or channel, and so on. Other reports and analytics for content creators may also be generated by the element analytics module 240. In some implementations, the element analytics module 240 also provides overall reporting and analytics for the element marketplace, as well as statistics and links to the content items having relevant elements. For example, the element analytics module 240 may provide the top ten element providers (e.g., in terms of user ratings), information on the best element for the price, element ratings and feedback, and so on. In addition, the elements analytics module 240 may provide a ranked content item directory, such as a ranked video directory, that contains a particular element (e.g., videos that use a particular Hawaiian sunset scene). Other reports and analytics for the overall element marketplace may also be generated by the element analytics module 240.

In some implementations, the element marketplace further facilitates matching element providers and content creators by allowing a content creator to request a specific element provider for special-order element creation. For example, if a content creator has had a good experience with a particular element provider and/or likes the elements generated by the particular elements provider, the element marketplace may enable communication between content creators and element providers for special-order element generation. Any special-order element generated by the element provider may then be uploaded and ingested into the element marketplace by the element intake module 210 and made available for use by other content creators.

In some implementations, an element marketplace as described above is provided in the context of streaming to a mobile device that is executing a content sharing platform application specifically designed for playback of content items utilizing elements from the element marketplace.

Figure 3:
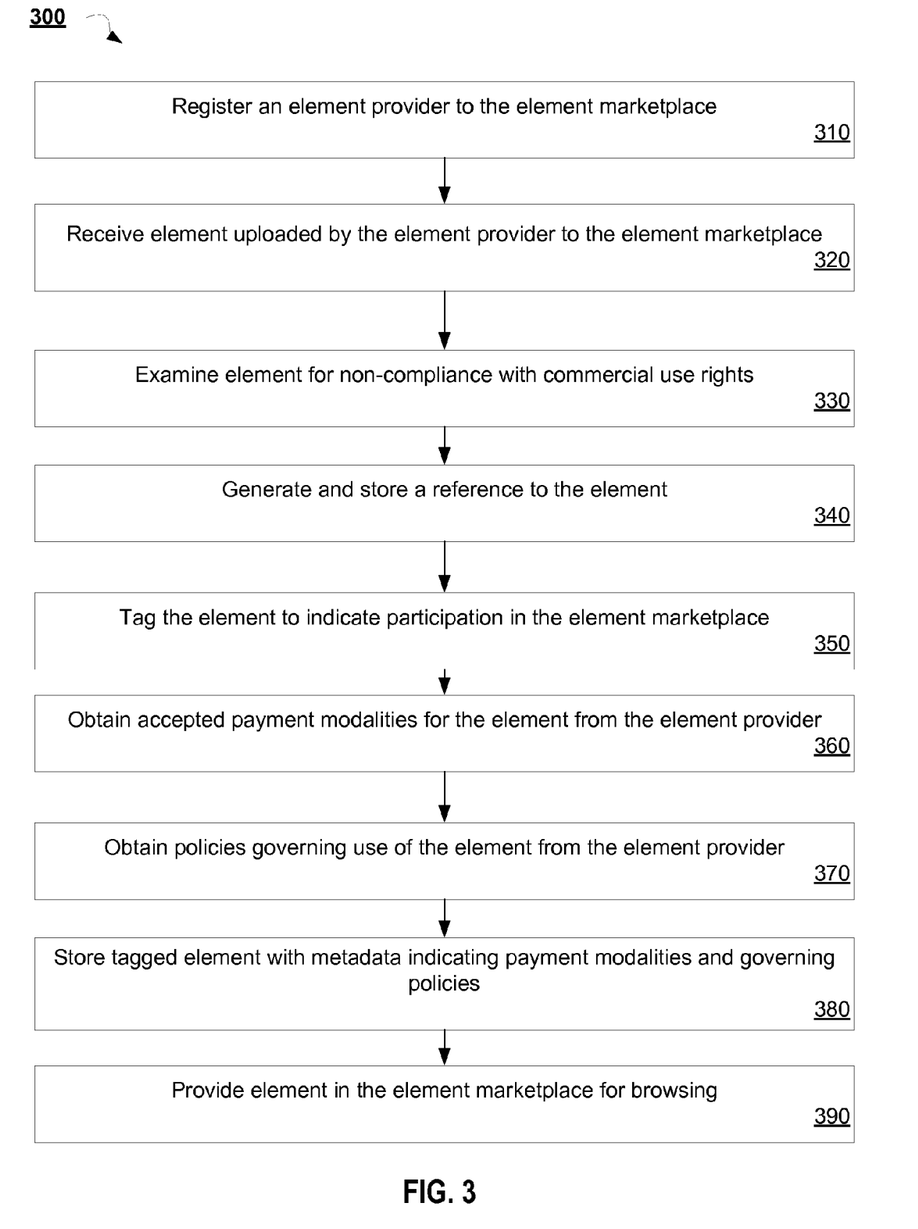
FIG. 3 is a flow diagram illustrating a method for element intake and presentation by an element marketplace, according to some implementations of the disclosure.

FIG. 3 is a flow diagram illustrating a method 300 for element intake and presentation by an element marketplace, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by element marketplace component 140 as shown in FIGS. 1 and 2.

Referring to FIG. 3, at block 310, method 300 begins at block 310 when an element provider is registered to an element marketplace. Then, at block 320, an element is uploaded to the element marketplace by the element provider. At block 330, the element is examined for non-compliance with commercial use rights (e.g., copyright violations, etc.). If the element violates any commercial use rights, then it may be rejected for ingestion in the element marketplace. Each element may be checked against existing elements (or references thereof) before being admitted to the element marketplace. In some implementations, if no match is found, the element may be indexed and become a reference itself.

Subsequently, at block 340, a reference to the element is generated and stored to the content sharing platform providing the element marketplace. In one implementation, the reference is a copy of the element used to identify matches within content items hosted by the content sharing platform. At block 350, the element is tagged to indicate participation in the element marketplace. Then, at block 360, accepted payment modalities for the element are obtained from the element provider. As discussed above, the element provider may indicate that one or more fee arrangements, such as, but not limited to, revenue sharing, flat fee, attribution, free, and so on, are acceptable for payment to use the element.

At block 370, policies governing use of the element from the element provider. In one implementation, the policies governing use may indicate where and how the element may be used in a content item by a content creator. Then, at block 380, the tagged element is stored in the element marketplace with metadata indicating the acceptable payment modalities and the governing policies for the element. Lastly, at block 390, the element is provided for browsing in the element marketplace.

Figure 4:
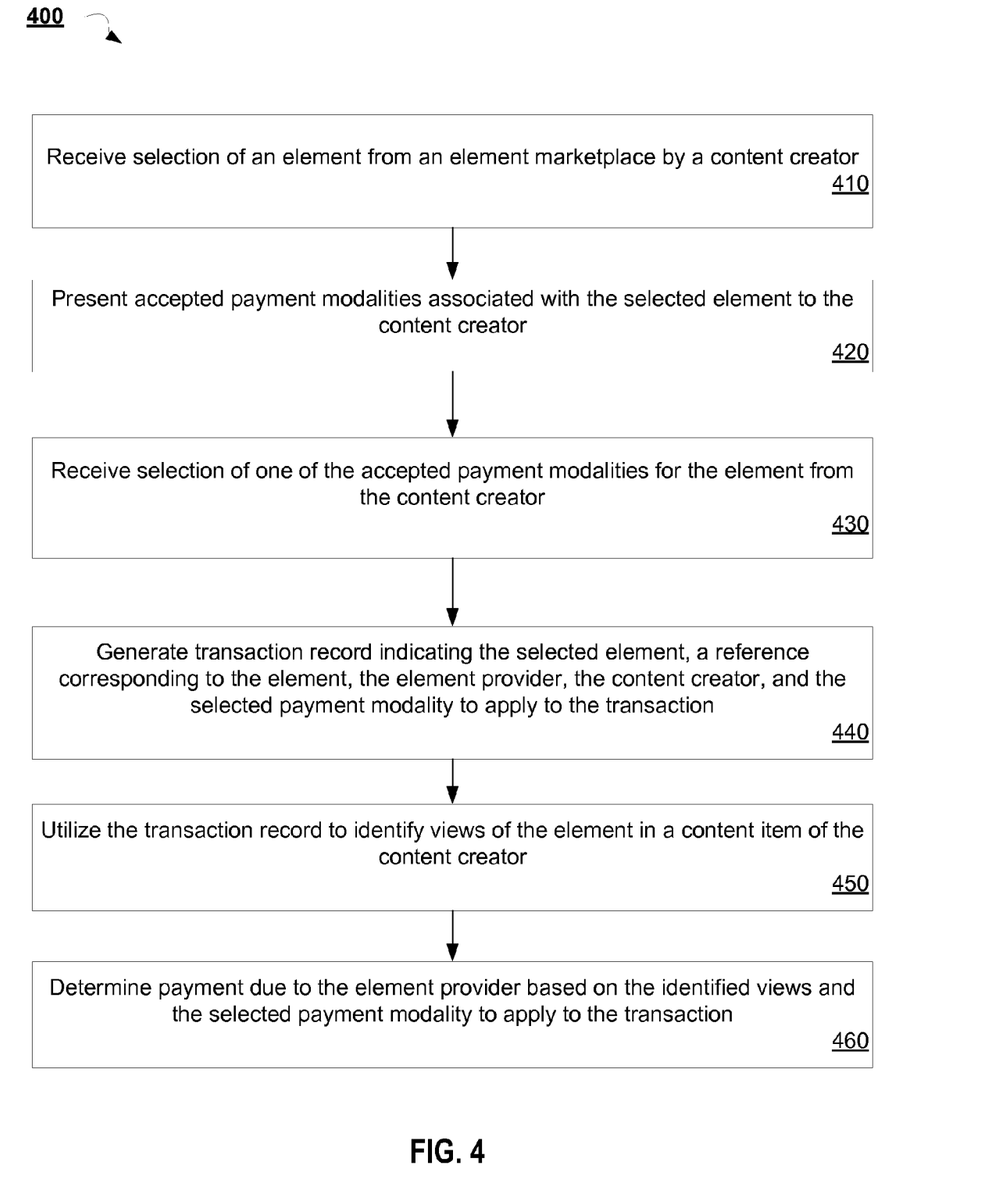
FIG. 4 is a flow diagram illustrating a method monitoring element transactions in an element marketplace, according to some implementations of the disclosure.

FIG. 4 is a flow diagram illustrating another method 400 for monitoring element transactions in an element marketplace, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by element marketplace component 140, as shown in FIGS. 1 and 2.

Referring to FIG. 4, at block 410, method 400 begins at block 410 when a selection of an element from an element marketplace is received. In one implementation, a content creator selects the element for use in the generation of a content item. At block 420, accepted payment modalities associated with the selected element are presented to the content creator. As discussed above, the payment modalities may include one or more fee arrangements, such as, but not limited to, revenue sharing, flat fee, attribution, free, and so on, are acceptable for payment to use the element. Subsequently, at block 430, a selection of one of the presented payment modalities is received from the content creator.

At block 440, a transaction record is generated for the element transaction. In one implementation, the transaction record may indicate the selected element, a reference corresponding to the selected element, the element provider, the content creator, and the selected payment modality to apply to the transaction. Furthermore, the transaction record may identify and log in which content items the element has been used. Then, at block 450, the generated transaction record is used to identify view of the element in a content item of the content creator. Lastly, at block 460, a payment due to the element provider is determined based on the identified view and the selected payment modality to apply to the transaction.

Figure 5:
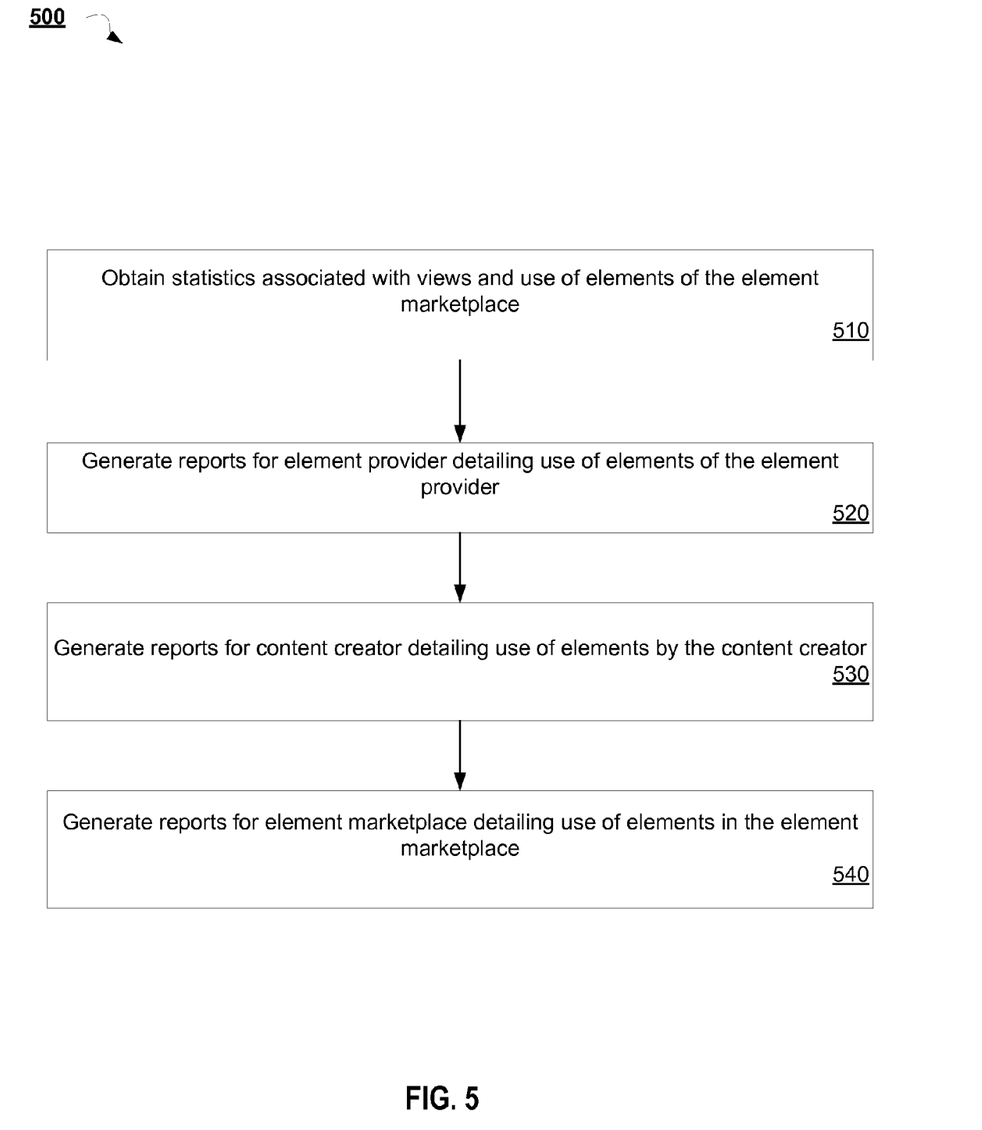
FIG. 5 is a flow diagram illustrating a method for generating analytics and reports for an element marketplace, according to some implementations of the disclosure.

FIG. 5 is a flow diagram illustrating another method 500 for generating analytics and reports for an element marketplace, according to an implementation of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by element marketplace component 140, as shown in FIGS. 1 and 2.

Referring to FIG. 5, at block 510, method 500 begins at block 510 when statistics associated with views and use of elements of an element marketplace are obtained. Then, at block 520, reports for an element provider detailing use of elements of the element provider are generated. In one implementation, the element provider reports detail information including, but are not limited to, how often elements of the element provider have been used, who (content creator) is using the elements, what content items are using the elements, how the content creators and content items having the element are performing (e.g., in terms of views, revenue, watch time, reception (e.g., likes, +1s, shares, and so on), etc.), other element providers used in same content items as elements, and regional statistics associated with element usage and viewing.

At block 530, reports for a content creator detailing use of elements by the content creator are generated. In one implementation, the content creator reports detail information including, but not limited to, recommendations for elements based on previous element usage, revenue share breakdowns, indications on how addition of elements has improved performance of a content item and/or channel, and so on. Lastly, at block 540, reports for the element marketplace are generated detailing use of elements in the element marketplace. In some implementations, the reports for the element marketplace provide the top ten element providers (e.g., in terms of user ratings), information on the best element for the price, element ratings and feedback, and so on.

Figure 6:
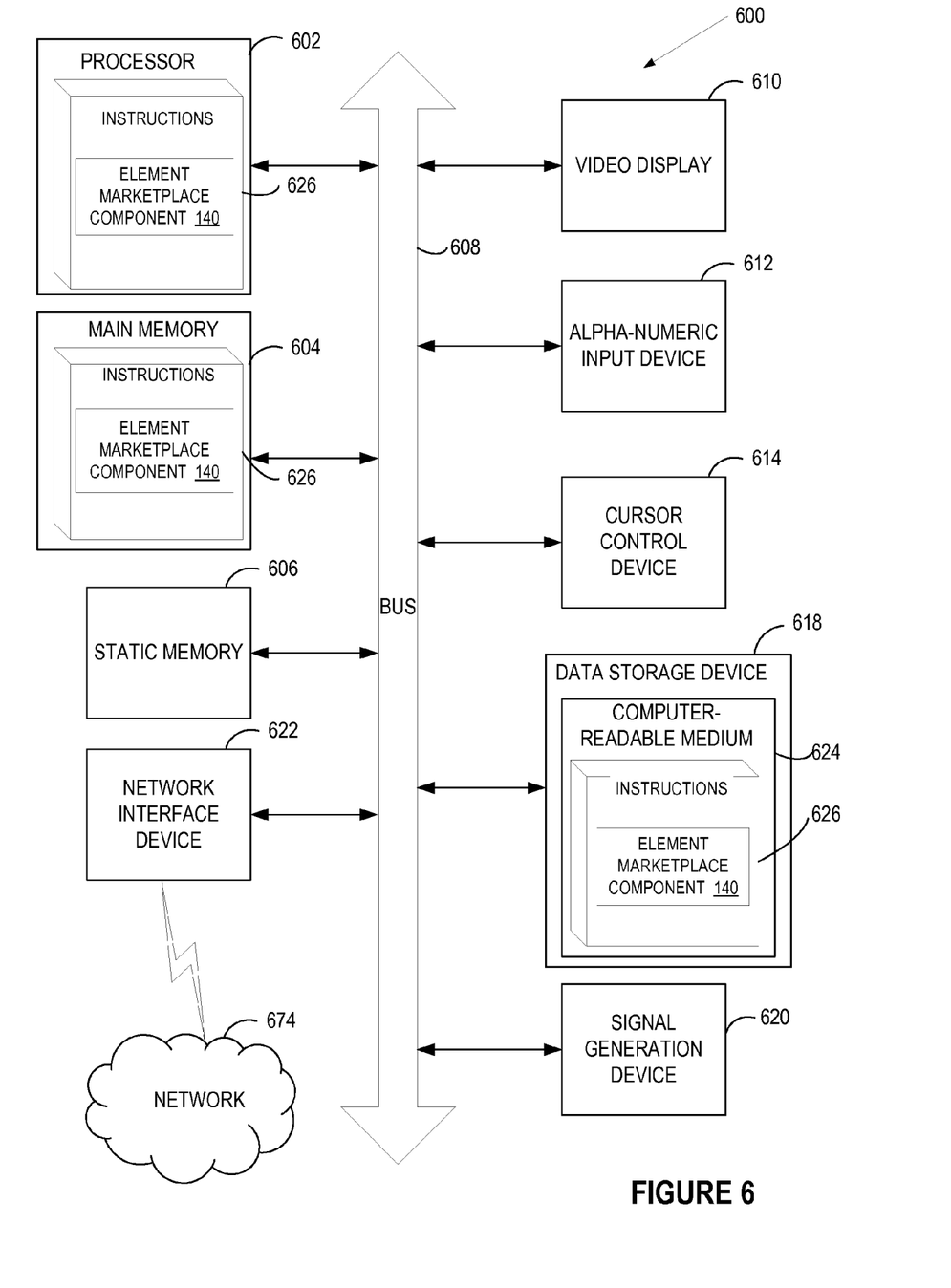
FIG. 6 is a block diagram illustrating an exemplary computer system, according to some implementations.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD), a cathode ray tube (CRT), or a touch screen), an alphanumeric input device 612 (e.g., a keyboard), a cursor control device 614 (e.g., a mouse), and a signal generation device 620 (e.g., a speaker).

The data storage device 618 may include a computer-readable storage medium 624 on which is stored one or more sets of instructions 626 (e.g., software) embodying any one or more of the methodologies or functions described herein. The instructions 626 may also reside, completely or at least partially, within the main memory 604 and/or within the processor 602 during execution thereof by the computer system 600, the main memory 604 and the processor 602 also constituting computer-readable storage media. The instructions 626 may further be transmitted or received over a network 674 via the network interface device 622.

In one embodiment, the instructions 626 include instructions for an element marketplace component 140, which may correspond, respectively, to their identically-named counterparts described with respect to FIGS. 1 and 2, and/or a software library containing methods that provide a content item element marketplace for a content sharing platform. While the computer-readable storage medium 624 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device of a server device of a content sharing platform providing a plurality of content items, an element uploaded by an element provider, the element comprising a segment of media that is separate from a content item of the plurality of content items and configurable for integration into presentation of the content item;

storing, by the processing device, the element on the content sharing platform with the plurality of content items;

identifying the element as participating in an element marketplace that is part of the content sharing platform;

obtaining, from the element provider, identification of one or more accepted payment modalities for the element;

associating the identified element with the obtained one or more accepted payment modalities in the element marketplace; and providing the identified element in the element marketplace for browsing by content creators.

2. The method of claim 1, wherein the element comprises at least one of an audio clip, a video clip, a still image, or computer-generated special effect.

3. The method of claim 1, further comprising registering the element provider to the element marketplace.

4. The method of claim 1, wherein the one or more accepted payment modalities comprise sharing of at least a portion of revenue associated with the content item integrating the element.

5. The method of claim 1, wherein the one or more accepted payment modalities comprise at least one of flat fee per view, single flat fee, attribution, or free.

6. The method of claim 1, further comprising prior to identifying the element, determining that the element is in compliance with commercial use rights.

7. The method of claim 1, further comprising generating and storing a reference to the element, the reference comprising a copy of the element utilized to identify occurrence of the element in content items.

8. The method of claim 1, further comprising obtaining, from the element provider, policies governing use of the element, the policies comprising at least a geographic location that the element can be used, a genre of content item that the element can be used in, or a maturity of the content item that the element can be used in.

9. The method of claim 1, further comprising:
receiving selection of the element from a content creator of the content creators as part of a transaction in the element marketplace;
receiving, from the content creator, selection of one of the accepted payment modalities for the element;
generating a transaction record to identify the transaction, the transaction record comprising identification of: the selected element, the reference corresponding to the selected element, the element provider, the content creator, and the selected payment modality;
utilizing the transaction record to identify a content item comprising the element and views of the element in the content item, wherein the content item generated by the content creator; and
determining a payment due to the element provider based on the identified views and the selected payment modality.

10. The method of claim 1, further comprising:
obtaining statistics associated with views of the elements, use of elements, and content items utilizing the elements of the element marketplace; and
generating analytic reports for the element provider, the content creators, and element marketplace based on the obtained statistics.

11. An apparatus comprising:
a display device;
a memory communicably coupled to the display device; and
a processing device communicably coupled to the memory, the processing device to execute instructions to:
receive an element uploaded by an element provider, the element comprising a segment of media that is configurable for integration into presentation of a content item of a plurality of content items provided by a content sharing platform, wherein the segment of media is separate from a plurality the content items;
store the element on the content sharing platform with the plurality of content items;
identify the element as participating in an element marketplace that is part of the content sharing platform;
obtain, from the element provider, identification of one or more accepted payment modalities for the element;
associate the identified element with the obtained one or more accepted payment modalities in the element marketplace; and
provide the identified element in the element marketplace for browsing by content creators.

12. The apparatus of claim 11, wherein the element comprises at least one of an audio clip, a video clip, a still image, or computer-generated special effect.

13. The apparatus of claim 11, wherein the one or more accepted payment modalities comprise at least one of sharing of at least a portion of revenue associated with the content item integrating the element, flat fee per view, single flat fee, attribution, or free.

14. The apparatus of claim 11, wherein the processing device further to generate and store a reference to the element, the reference comprising a copy of the element utilized to identify occurrence of the element in content items.

15. The apparatus of claim 11, wherein the processing device further to obtain, from the element provider, policies governing use of the element, the policies comprising at least a geographic location that the element can be used or a genre of content item that the element can be used in.

16. The apparatus of claim 11, wherein the processing device further to:
receive selection of the element from a content creator of the content creators as part of a transaction in the element marketplace;
receive, from the content creator, selection of one of the accepted payment modalities for the element;
generate a transaction record to identify the transaction, the transaction record comprising identification of: the selected element, the reference corresponding to the selected element, the element provider, the content creator, and the selected payment modality;
utilize the transaction record to identify a content item comprising the element and views of the element in the content item, wherein the content item generated by the content creator; and
determine a payment due to the element provider based on the identified views and the selected payment modality.

17. The apparatus of claim 11, wherein the processing device further to:
obtain statistics associated with views of the elements, use of elements, and content items utilizing the elements of the element marketplace; and
generate analytic reports for the element provider, the content creators, and element marketplace based on the obtained statistics.

18. A non-transitory machine-readable storage medium storing instructions which, when executed, cause a processing device to perform operations comprising:
- receiving, by the processing device of a server device of a content sharing platform providing a plurality of content items, an element uploaded by an element provider, the element comprising a segment of media that is separate from a content item of the plurality of content items and configurable for integration into presentation of the content item;
- storing, by the processing device, the element on the content sharing platform with the plurality of content items;
- identifying the element as participating in an element marketplace that is part of the content sharing platform;
- obtaining, from the element provider, identification of one or more accepted payment modalities for the element;
- associating the identified element with the obtained one or more accepted payment modalities in the element marketplace; and
- providing the identified element in the element marketplace for browsing by content creators.

19. The non-transitory machine-readable storage medium of claim 18, wherein the element comprises at least one of an audio clip, a video clip, a still image, or computer-generated special effect.

20. The non-transitory machine-readable storage medium of claim 18, wherein the one or more accepted payment modalities comprise at least one of sharing of at least a portion of revenue associated with the content item integrating the element, flat fee per view, single flat fee, attribution, or free.

21. The non-transitory machine-readable storage medium of claim 18, further comprising generating and storing a reference to the element, the reference comprising a copy of the element utilized to identify occurrence of the element in content items.

22. The non-transitory machine-readable storage medium of claim 18, further comprising obtaining, from the element provider, policies governing use of the element, the policies comprising at least a geographic location that the element can be used or a genre of content item that the element can be used in.

23. The non-transitory machine-readable storage medium of claim 18, further comprising:
- receiving selection of the element from a content creator of the content creators as part of a transaction in the element marketplace;
- receiving, from the content creator, selection of one of the accepted payment modalities for the element;
- generating a transaction record to identify the transaction, the transaction record comprising identification of: the selected element, the reference corresponding to the selected element, the element provider, the content creator, and the selected payment modality;
- utilizing the transaction record to identify a content item comprising the element and views of the element in the content item, wherein the content item generated by the content creator; and
- determining a payment due to the element provider based on the identified views and the selected payment modality.

* * * * *